US007428530B2

(12) United States Patent
Ramarathnam et al.

(10) Patent No.: US 7,428,530 B2
(45) Date of Patent: Sep. 23, 2008

(54) DISPERSING SEARCH ENGINE RESULTS BY USING PAGE CATEGORY INFORMATION

(75) Inventors: Bama Ramarathnam, Sammamish, WA (US); Gregory N. Hullender, Bellevue, WA (US); Darren A. Shakib, North Bend, WA (US); Nicole A. Hamilton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 10/883,460

(22) Filed: Jul. 1, 2004

(65) Prior Publication Data

US 2006/0004717 A1 Jan. 5, 2006

(51) Int. Cl.
*G06F 17/30* (2006.01)
(52) U.S. Cl. .................... 707/3; 707/2; 707/7; 707/10; 709/203; 709/219
(58) Field of Classification Search ................. 707/2, 707/3, 6, 7, 104.1; 709/203, 219
See application file for complete search history.

(56) References Cited

U.S. PATENT DOCUMENTS

| | | | |
|---|---|---|---|
| 4,991,094 A | 2/1991 | Fagan et al. | |
| 5,634,051 A * | 5/1997 | Thomson | 707/5 |
| 5,752,025 A | 5/1998 | Shakib et al. | |
| 6,178,419 B1 | 1/2001 | Legh-Smith et al. | |
| 6,233,575 B1 | 5/2001 | Agrawal et al. | |
| 6,334,131 B2 | 12/2001 | Chakrabarti et al. | |
| 6,389,436 B1 | 5/2002 | Chakrabarti et al. | |
| 6,516,337 B1 * | 2/2003 | Tripp et al. | 709/202 |
| 6,526,440 B1 | 2/2003 | Bharat | |
| 6,529,903 B2 | 3/2003 | Smith et al. | |
| 6,615,209 B1 | 9/2003 | Gomes et al. | |
| 6,631,365 B1 * | 10/2003 | Neal et al. | 707/2 |
| 6,658,423 B1 | 12/2003 | Pugh et al. | |
| 6,678,681 B1 | 1/2004 | Brin | |
| 6,701,314 B1 | 3/2004 | Conover et al. | |
| 6,785,671 B1 * | 8/2004 | Bailey et al. | 707/3 |
| 6,910,029 B1 * | 6/2005 | Sundaresan | 707/2 |
| 6,944,609 B2 * | 9/2005 | Witbrock | 707/3 |

(Continued)

FOREIGN PATENT DOCUMENTS

WO WO 01/46870 6/2001

(Continued)

OTHER PUBLICATIONS

"Building a Distributed Full-Text Index for the Web," ACM Transactions on Information Systems (TOIS), Jul. 2001, pp. 217-241, vol. 19, Issue 3, ACM Press, New York, U.S.A.

(Continued)

*Primary Examiner*—Leslie Wong
(74) *Attorney, Agent, or Firm*—Senniger Powers LLP

(57) ABSTRACT

Systems and methods for dispersing search engine results by category. A search engine application queries a searchable index of document data associated with a plurality of electronic documents in response to a search request to identify one or more electronic documents having document data matching data included in the search request. The search engine application disperses identified electronic documents according to category data included in the document data for display to a user.

23 Claims, 6 Drawing Sheets

U.S. PATENT DOCUMENTS

| | | |
|---|---|---|
| 2002/0107853 A1 | 8/2002 | Hofmann et al. |
| 2002/0123988 A1 | 9/2002 | Dean et al. |
| 2002/0133481 A1 | 9/2002 | Smith et al. |
| 2003/0037074 A1 | 2/2003 | Dwork et al. |
| 2003/0195872 A1 | 10/2003 | Senn |
| 2003/0195877 A1* | 10/2003 | Ford et al. .................... 707/3 |
| 2003/0212699 A1 | 11/2003 | Denesuk et al. |
| 2003/0226108 A1 | 12/2003 | Oezgen |
| 2004/0003097 A1* | 1/2004 | Willis et al. ................ 709/228 |
| 2004/0049514 A1 | 3/2004 | Burkov |
| 2004/0199419 A1 | 10/2004 | Kim et al. |
| 2004/0249824 A1 | 12/2004 | Brockway et al. |
| 2005/0149504 A1 | 7/2005 | Ratnaparkhi |

FOREIGN PATENT DOCUMENTS

| | | |
|---|---|---|
| WO | WO 01/55905 | 8/2001 |
| WO | WO 02/41190 | 5/2002 |

OTHER PUBLICATIONS

Chen et al., "Bringing Order to the Web: Automatically Categorizing Search Results," Proceedings fo the SIGCHI Conference on Human Factors in Computing Systems, 2000, pp. 145-152, ACM Press, New York, U.S.A.

Khoussainov et al., "Automated Index Management for Distributed Web Search," 2003, pp. 386-392, ACM Press, New York, U.S.A.

Tomlin, "A New Paradigm for Ranking Pages on the World Wide Web," 2003, pp. 350-355, ACM Press, New York, U.S.A.

MooterSearch printed from http://www.mooter.com/corp/, on Jun. 29, 2004, 9 pages, MooterSearch Company, Austraila.

Brin, S. et al., "The Anatomy of a Large-Scale Hypertextual Web Search Engine" Proceedings of the 7th International World Wide Web Conference, 1998, 18 pages, available at http://www7.scu.edu.au/programme/fullpapers/1921/com1921.htm WWW Consortium, Australia.

Sebastiani F. "Machine Learning in Automated Text Categorization" ACM Mar. 2002 pp. 1-47.

Jenkins et al., "Adaptive Automatic Classification on the Web," IEEE Computer Society, 2000, pp. 504-511, 11th International Workshop on Database and Expert Systems Applications, Sep. 4-8, 2000, London, United Kingdom.

Author Unknown, Web Crawler, Web Crawler—Wikipedia, the free enclyclopedia, http://en.wikipedia.org/wiki/Spidering, last modified Nov. 16, 2006, 12 pages, Wikimedia Foundation, Inc., US.

* cited by examiner

FIG. 4

DISPERSING SEARCH ENGINE RESULTS BY USING PAGE CATEGORY INFORMATION

TECHNICAL FIELD

The present invention relates to the field of searching for relevant data in the form of electronic documents on a data communications network. In particular, embodiments of this invention relate to dispersing search results according to categories of electronic documents found during a search.

BACKGROUND OF THE INVENTION

The Internet has vast amounts of information distributed over a multitude of computers, hence providing users with large amounts of information on various topics. This is also true for a number of other communication networks, such as intranets and extranets. Although large amounts of information may be available on the network, finding the desired information may not be easy or fast.

Search engines have been developed to address the problem of finding desired information on a network. A conventional search engine includes a crawler (also called a spider or bot) that visits an electronic document on a network, "reads" it, and then follows links to other electronic documents within a website. The crawler returns to the website on a regular basis to look for changes. An index, which is another part of the search engine, stores information regarding the electronic documents that the crawler finds. In response to one or more user-specified search terms, the search engine returns a list of network locations (e.g., uniform resource locators (URLs)) that the search engine has determined include electronic documents relating to the user-specified search terms. Some search engines provide categories of information (e.g., news, web, images, etc.) and categories within those categories for selection by the user, who can thus focus on an area of interest from these categories.

Search engine software generally ranks the electronic documents that fulfill a submitted search request in accordance with their perceived relevance, and provides a means for displaying search results to the user according to their rank. A typical relevance ranking is a relative estimate of the likelihood that an electronic document at a given network location is related to the user-specified search terms in comparison to other electronic documents. For example, a conventional search engine may provide a relevance ranking based on the number of times a particular search term appears in an electronic document, its placement in the electronic document (e.g., a term appearing in the title is often deemed more important than the term appearing at the end of the electronic document). Link analysis, anchor-text analysis, web page structure analysis, the use of a key term listing, and the URL text are other known techniques for ranking web pages and other hyperlinked documents.

Currently available search engines are generally limited to displaying search results according to the perceived rank. Unfortunately, this may provide insufficient information to the user because the highest ranking results may all fall within a single category of information. For example, the names of many products have more than one meaning (automobiles are named after planets, personal computers are named after fruit, etc.). The value of the first page search results to the user may depend on whether the user is interested in information on, for instance, the planet Saturn or on an automobile of the same name. As a result, it is often necessary for users to refine a query or read several pages of search results because too many of the displayed results on a first page relate to a single topic or category.

Thus, the need exists for a search engine that displays search results related to various topics or categories on a single page of search results independent of conventional rankings. By displaying such dispersed search results, the user is able to view a variety of results on the first page of results.

SUMMARY OF THE INVENTION

Embodiments of the invention overcome one or more deficiencies in the prior art by providing, among other things, improved searching for relevant data on a data communications network. By displaying varied search results to a user on a first page of search results in response to a search request, the invention enables the user to more easily locate relevant documents on the network. In particular, one embodiment of the invention disperses search results by category such that a user can easily view search results for different categories on a first page of the search results. By dispersing the search results by category, the user can view results within a variety of categories without scrolling or going to a next page of search results. Moreover, by dispersing search results by category on the first page of search results, users will be able to identify relevant results more readily and, thus, will have a more enjoyable and productive search experience. In addition, the features of the present invention described herein are less laborious and easier to implement than currently available techniques as well as being economically feasible and commercially practical.

In accordance with one aspect of the invention, a method of generating search results is provided. The method includes receiving a search request from a user. The method also includes querying a searchable index as a function of the received search request to identify electronic documents that may be relevant to the search request. The index contains document data associated with a plurality of electronic documents. The document data specifies one or more categories associated with each of the electronic documents. The method includes sorting the results of said querying as a function of the one or more categories associated with the identified electronic documents. The method further includes displaying the sorted results to the user such that one or more of the identified electronic documents in different categories are displayed to the user on a single page.

In accordance with another aspect of the invention, a computer-readable medium includes computer-executable instructions for generating search results. A search form component receives a search request from a user. A search engine component queries a searchable index as a function of the received search request to identify electronic documents that may be relevant to the search request and for sorting the results of said querying. The index contains document data associated with a plurality of electronic documents. The document data specifies one or more categories associated with each of the electronic documents. The results are sorted as a function of the one or more categories associated with the identified electronic documents. A user interface component displays the sorted results to the user such that one or more of the identified electronic documents in different categories are displayed to the user on a single page.

In accordance with another aspect of the invention, a system for generating search results in response to a search request received from a user via a client computer is provided. The system includes a first server for receiving the search request from the user via the client. The first server is coupled to the client via a communication network. The system also includes an index containing document data associated with a plurality of electronic documents. The document data specifies one or more categories associated with each of the electronic documents. The said first server is configured to query the index as a function of the received search request to identify electronic documents that may be relevant to the search request and to sort the results of said query. The results are sorted as a function of the one or more categories associated with the identified electronic documents for display to the user at the client such that one or more of the identified electronic documents in different categories are displayed to the user on a single page.

In accordance with yet another of the invention, one or more computer-readable media having stored thereon a searchable data structure is provided. A first field for storing data representing a search engine index term associated with an electronic document located on a network. The index term is included in the electronic document. A second field for storing data representing a category associated with the electronic document. A third field for storing data that represents a location of the electronic document on the network. The document data included in the second field is indexed according to the first field such that one or more categories are associated with the index term, and the document data included in the third field is indexed according to the second field such that one or more locations of the electronic documents are associated with each of the one or more categories.

BRIEF DESCRIPTION OF THE DRAWINGS

FIG. 4 illustrates an exemplary screen shot of a search results page.

Corresponding reference characters indicate corresponding parts throughout the drawings.

DETAILED DESCRIPTION OF THE INVENTION

Figure 1:
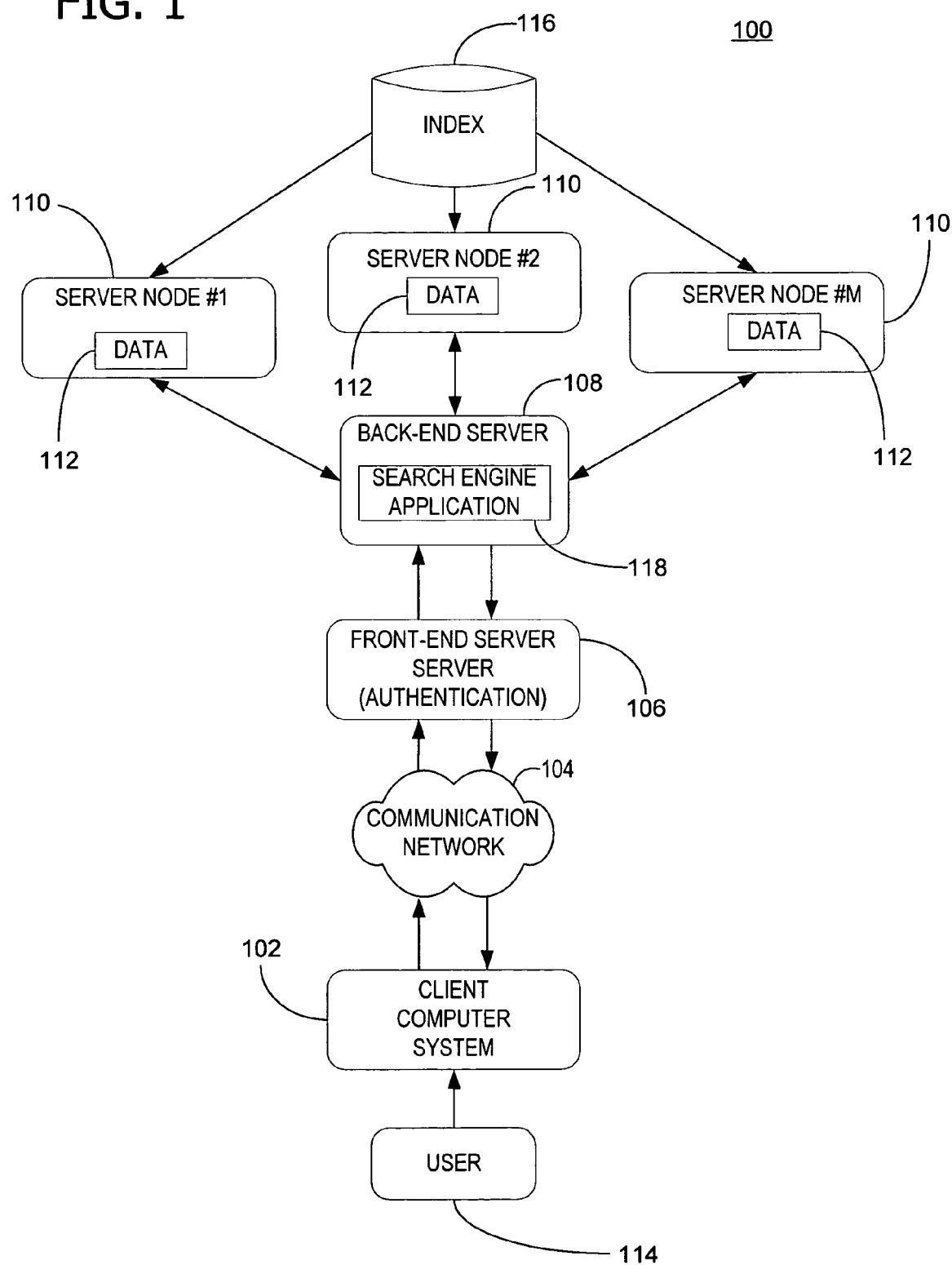
FIG. 1 is a block diagram illustrating an exemplary network environment in which the invention can be utilized.

Referring now to the drawings, FIG. 1 illustrates an exemplary network environment 100 in which the present invention may be utilized. A client 102 is coupled to a data communication network 104, such as the Internet (or the World Wide Web). One or more servers communicate with the client 102 via the network 104 using a protocol such as Hypertext Transfer Protocol (HTTP), a protocol commonly used on the Internet to exchange information. In the illustrated embodiment, a front-end server 106 and a back-end server 108 (e.g., web server or network server) are coupled to the network 104. The client 102 employs the network 104, front-end server 106, and back-end server 108 to access web page data stored, for example, on one or more server nodes 110. In this manner, client 102 can request access to web page data 112 maintained by the one or more server nodes 110 via network 104.

Embodiments of the invention provide improved searching for relevant data on a data communications network by permitting varied search results to be displayed to a user 114 on a single page of search results in response to a user-specified search request. In particular, one embodiment of the invention disperses search results by category such that the user 114 can easily view search results for different categories on a first page of the search results. By dispersing the search results by category, user 114 can view results within a variety of categories without scrolling or going to a next page of search results. Moreover, by dispersing search results by category on a singe page (e.g., first page) of search results, the users will be able to identify relevant results more readily and, thus, will have a more enjoyable and productive search experience.

In this embodiment, user 114 uses the client 102 to input a search request including one or more terms concerning a particular topic of interest for which the user 114 would like to identify electronic documents (e.g., web pages) that discuss and/or relate to the particular topic of interest. For example, the front-end server 106 is responsive to client 102 for authenticating the user 114 and redirecting a request from the authenticated user to the back-end server 108.

The back-end server 108 is responsive to a redirected search request or the like to submit a query to one or more of the affiliated node servers 110, each linked to a central data index (index) 116 containing information regarding electronic documents such as web pages available via the Internet, to retrieve data for electronic documents (i.e., search results) that may be relevant to the user. Moreover, each node server 110 may include a memory cache (not shown) for storing previously retrieved document data (i.e., web page data 112). As explained in more detail below in reference to FIG. 2, the index 116 includes data for electronic documents such as location (e.g., links, or URLs), metatags, text, and document category. In the example of FIG. 1, the invention is described in the context of dispersing search results retrieved from the one or more affiliated node servers 110 by category, and displaying the dispersed search results to the user 114 via client 102. Notably, although front-end server 106 and back-end server 108 are described as different components in a network environment, it is to be understood that a single server could perform the functions of both.

The present invention employs a search engine application (application) 118, which is executed by the back-end server 108 to identify web pages and the like (i.e., electronic documents) within various categories in response to the search request received from client 102. More specifically, the application 118 identifies relevant web pages within various categories from index 116 that correspond to the one or more terms included in the search request, and identifies the most relevant web pages for each of the identified categories to be displayed to user 114 via client 102. For example, if the user input (i.e., search request) defines the term "apple," search engine application 118 may disperse results in a fruit category and an Apple® computer category. By dispersing the results via categorization and choosing a number of the best results (i.e., most relevant) from each category for display, user 114 is allowed to view the most relevant web pages associated with a variety of different categories on a first page of the search results.

Figure 2:
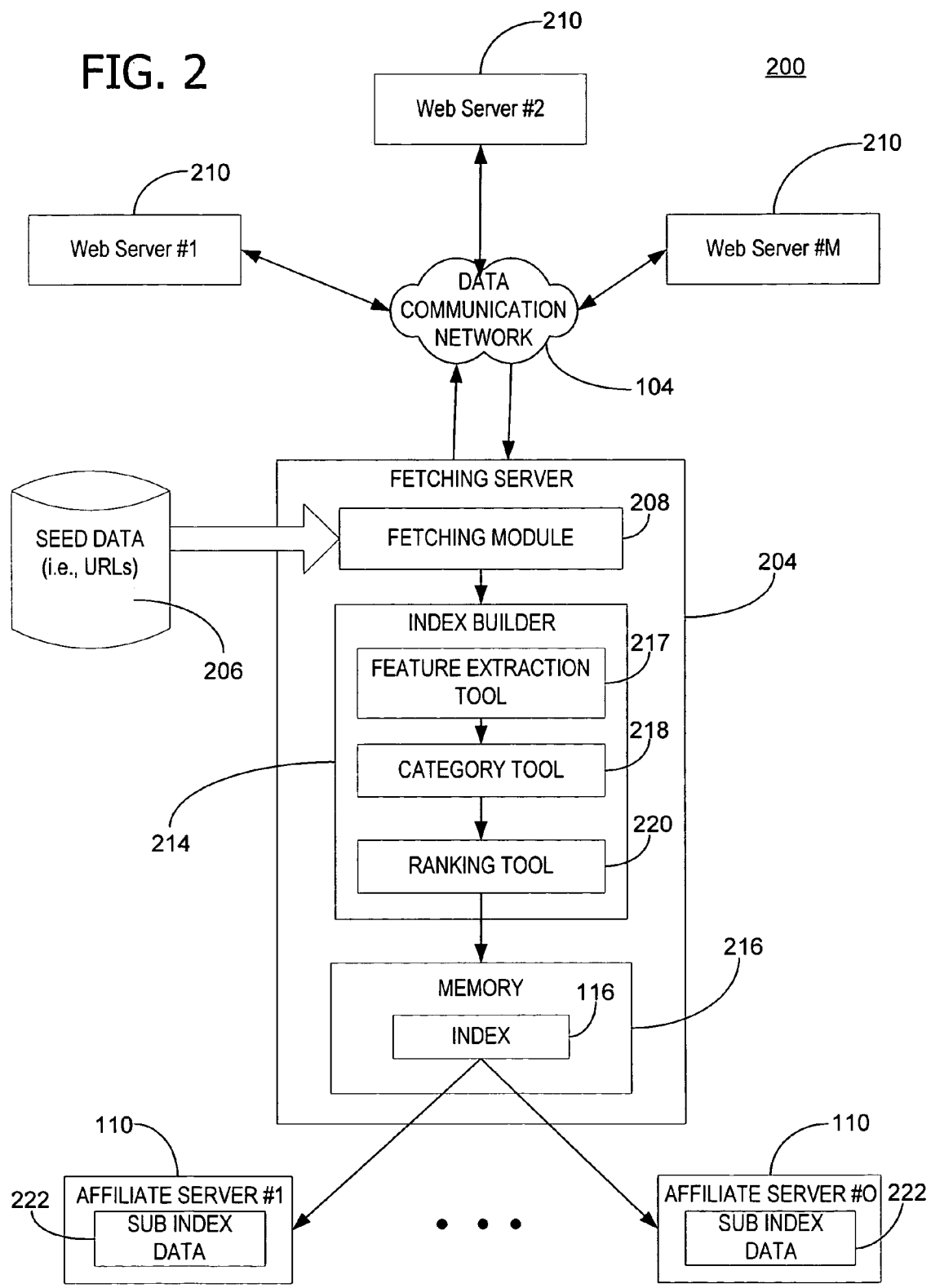
FIG. 2 is a block diagram illustrating components of a system used to populate an index according to one embodiment of the invention.

Referring now to FIG. 2, a block diagram illustrates the components of an exemplary computer network 200 used to populate the index 116 in which the present invention accesses to retrieve search results within various categories for display on a single page of search results.

In one embodiment, a fetching server 204 is responsive to seed data 206 to execute a fetching module 208 to retrieve HTML documents such as web pages from various Due to the voluminous amounts of web pages available via the Internet, a plurality of fetching servers 204, each executing fetching modules 208, can be employed to retrieve and analyze web page content. For example, a group of fetching servers 204 can be partitioned by domain hash. A domain hash refers to a normalized form of a URL. For instance, the URL "www dot a dot com/services" is transformed to "www dot a dot com:80." A 10-byte hash of this string can then be taken, for example, and specific bytes (e.g., 80) within hash stings are used to determine which fetching server 204 will handle that particular partition of the hash. In other words, each fetching server 204 is responsible for a partition of the domain hash space. For example, if there were four (4) fetching servers 204 and the entire domain hash space had a range of values 1-400, the division may be broken down as follows:

Fetching Server 1;
   Low Hash: 1
   Hi Hash: 100

Fetching Server 2;
   Low Hash: 101
   Hi Hash: 200

Fetching Server 3;
   Low Hash: 201
   Hi Hash: 300

Fetching Server 4;
   Low Hash: 301
   Hi Hash: 400

Thus, in the case of the URL transformed to www dot a dot com:80, fetching server #1 would be reassigned this particular URL. Thereafter, the fetching module 208 passes the retrieved electronic documents to an index builder module 214.

An index builder module 214 is responsive to received web pages and executable by the fetching server 204 to parse the content of each of the retrieved web pages to identify document data, and to create and maintain an index 116 of identified document data for each of the received electronic documents. In this embodiment, the index 116 is stored in a memory 216 of server 204 and includes an organized list of various types of identified data structures and their schemas. For example, the index builder 214 includes a feature extraction tool 217 for parsing the obtained electronic documents to detect structured data (e.g., URLs, words, metatags, etc.) and incrementally adds index terms that represent the detected structured data to the index 116 in memory 216. Notably, although index 116 is described above as being maintained in memory 216 on the server 204, it is contemplated that the index may be maintained on an external storage medium associated with a remote server.

A category tool 218 is linked to index 116, and identifies one or more categories for each of the retrieved web pages as a function of the parsed content (i.e., identified document data) and one or more external data sources such as the Open Directory Project (ODP) or index data regarding previously categorized web pages. As known to those skilled in the art, the ODP is one of the most widely distributed databases of content classified by humans. For example, assume the ODP has categorized a web page having the URL www dot gs dot com under Business Finance, and has categorized a web having the URL www dot gs dot com/venturecapital/under Business Finance Entrepreneurship. If the category tool 218 is given the URL www dot gs dot com/venturecapital/foo/bar.html to categorize, it will initially query the external data sources and/or index for a matching URL. If the URL www dot gs dot com/venturecapital/foo/bar.html is not found, the category tool 218 will then query the external data sources and/or index for www dot gs dot com/venturecapital/foo. Finally, if www dot gs dot com/venturecapital/foo is not found, the category tool 218 will check for www dot gs dot com/venturecapital and will assign the web page (i.e., www dot gs dot com/venturecapital/foo/bar.html) with the category Business Finance Entrepreneurship. It is possible for www.g-s.com itself to have a category. Also, it's possible that the shorter URLs have different categories. For example, www dot gs dot com might just be Business→Fianance. After a particular page has been categorized, the identified category information for that particular page is maintained in the index 116. The types of identified data specified in the index may also include: document origin (i.e., URL); words; metatags; document data returned in hypertext transfer protocol (HTTP) headers, resource description framework (RDF) data. Along with the identified categories there may be a confidence level assigned to that category. For example, a travel page on Hawaii might have category "Recreation\Travel" with confidence of 80% and a category of US\States\Hawaii with a confidence of 75%. web servers 210 accessible via the Internet (or the World Wide Web) 104. As known to those skilled in the art, seed data 206 may include a list of URLs, each identifying a location of a particular web server 210 maintaining one or more HTML documents. The fetching module 208 uses seed data 206 (i.e., seed URLs) to initiate a crawl of network 104 (e.g., the World Wide Web). As used herein, the term "crawl" refers to the process of retrieving and analyzing content on web pages identified by the seed data 206. For example, during the crawling process, URLs included in each of the retrieved web pages are identified by the fetching module 208 and used to access and analyze content on additional web pages.

A ranking tool 220 calculates a relevance rating for documents within a particular category. In one embodiment, the ranking engine employs one or more learning-based classifiers to determine one or more ratings for the document relative to a selected category or topic (such as automobiles), and then combines the results to produce an overall classification and/or rating. A variety of learning-based classifiers can be used for rating documents. Examples of such classifiers include, but are not limited to, decision trees, neural networks, Bayesian networks, and support vector machines such as described in the commonly assigned U.S. Pat. No. 6,192,360, the entire disclosure of which is incorporated herein by reference. The determined rating of a particular document relative to a particular category can be used for organizing documents within the index.

The index 116 may be distributed across many affiliate servers 224 (e.g., hundreds of affiliated node servers 110) because a single computer may not have sufficient memory to store a large index. Thus, index 116 may be stored on multiple computers as one or more files (e.g., documents). Moreover, each server 224 (or server 110) may include a subset of index 116. For example, index 116 may list a billion network locations, where network locations 1 to 1000 are listed in a subindex 222 stored on a first affiliate server, network locations 1001 to 2000 are listed in a second subindex 222 stored on another affiliate server, and so on. These files may then be concatenated or linked into a long list of network locations such that these files may be treated as a single large file. In response to a search request, a query processor then issues a query on the computers that include subsets of index 116.

In one embodiment of the invention, index builder 214 partitions index 116 for distribution to servers 224, for example, based on the listed index terms. Accordingly, if the partition of the index terms within these files is known, a particular file where a specific index term appears may be determined, even if this index term appears in more than one file. In an alternative embodiment of the invention, index builder 214 may distribute index 116 to the servers 224 randomly or semi-randomly. Random or semi-random distribution of index 116 may provide efficient load balancing among query processors. It may prevent a particular query processor from processing a larger number of queries than other query processors because of, for example, a collocation of popular terms. Thus, by distributing index 116 randomly or semi-randomly, query processing may be divided more evenly and predictably among query processors.

To distribute index 116 across multiple servers, the index builder 214 divides index 116 into chunks. In particular, index builder 214 creates index 116 by compiling the index terms determined from the detected structured data into chunks of index and distributing the chunks to the computers. Periodically, the index builder 214 stacks new index chunks into index 116. That is, the index builder 214 periodically (e.g., five times during a minute) merges smaller, incremental index fragments into the larger index 116.

In an embodiment of the invention, to merge new index chunks representing updated data (i.e., previously obtained and parsed electronic documents may include new or updated structured data) into index 116, the index builder 214 first extracts the new chunks. Subsequently, index builder 214 detects a first index term within the set of new chunks. The index builder 214 further combines the network locations and attributes associated with this index term across the set of new chunks into a single list. Index builder 214 then inserts this list into a new index file. Moreover, index builder 214 periodically removes old index chunks from the updatable index 116 as it merges new chunks into index 116. Additionally, before index builder 214 merges the new index chunks, these new chunks may not be available for querying by a query processor. But after index builder 214 merges the new chunks into index 116, the newly merged index 116 may be available for querying. In order to help determine whether two pages are identical and eliminate duplicates at query time, shingle prints will be used. The shingle print is composed of six, 16-bit unsigned values. Each 16 bit value expresses substantial syntactic similarity between two documents. For example, four of the six shingles will almost always match when the underlying similarity between two documents is greater than 95%.

Referring now to Table 1, document data included an exemplary index 116 is shown.

TABLE 1

|     | C1 TERM | C2 CAT_ID | C3 DOC_ID | C4 RATING | C5 SUMMARY_DESC |
| --- | --- | --- | --- | --- | --- |
| R1 | APPLE | 2 | 168 | 90 | APPLES & MORE PRESERVING APPLES |
| R2 | | 2 | 402 | 85 | APPLES & NUTRITION |
| R3 | | 2 | 302 | 80 | COOKING WITH APPLES/ EASY FRUIT SALAD |
| R4 | | 4 | 102 | 90 | MC COMPUTERS |
| R5 | | 4 | 202 | 88 | PERSONAL COMPUTERS |
| R6 | | 4 | 205 | 75 | COMPARING APPLES ™ |
| R7 | WASHINGTON_STATE | 5 | 307 | 95 | WELCOME TO WASHINGTON STATE TOURISM |
| R8 | | 5 | 308 | 90 | WASHINGTON STATE UNIVERSITY |
| R9 | | 5 | 315 | 30 | WASHINGTON STATE APPLE COMMISION |
| R10 | SATURN | 7 | 218 | 100 | SATURN.COM SHOW ROOM |
| R11 | | 7 | 225 | 98 | SATURN CAR DEALERS |
| R12 | | 7 | 250 | 80 | AUTO REVIEWS |
| R13 | | 12 | 405 | 99 | SATURN THE SIXTH PLANET FROM THE SUN |
| R14 | | 12 | 410 | 95 | SATURN THE PLANET |
| R15 | | 12 | 412 | 90 | SATURN EVENTS |

As described above in reference to FIGS. 1 and 2, index 116 includes document data for a plurality of electronic documents identified during the crawling process. Each of the columns (C1-C5) corresponds to the value of various data fields for a particular electronic document. Each of the rows (R1-R5) corresponds to a particular electronic document. In this instance, the index includes a list of unique index terms (i.e., words). Following the unique index term is a list of category identifiers (category IDs) each representative of a particular category to which the electronic document having the unique index term has been assigned. The category ID is specified byte value (e.g., 4 byte) that uniquely identifies a particular category unique category ID and can be used for querying and for aggregation purposes. For example, each category assigned by a category data source such as ODP is also assigned a unique category ID. For instance, a category ID having a value 2 listed in Table 1 corresponds to a fruit category (e.g., see cells located at R1 and C2 in Table 1; hereinafter referred to as R1C2). In one embodiment, index 116 is linked to a lookup table containing a list of category names and their corresponding category IDs. Thus, given a category ID, index builder 214 is responsive to the search request to query the table and quickly retrieve a category name for a particular category ID. Moreover, given a category ID, index builder 214 can identify all parents of that category, and subcategories of that category. For example, referring to the example discussed above in reference to FIG. 1, if a user enters a search term that corresponds to web pages having in the category "Business→Finance→," the search engine should be able to show all results from subcategories of this category such as Business→Finance→Mortgages.

As another example, if search results retrieved in response to an initial search term are within the category Automotives\Saturn, the user may elect an option to view more results under the category Automotives\Saturn. In this case, the dispersion occurs at the sub category level under Saturn. Sub categories could include used cars, dealerships, servicing, model details etc. In contrast, when the user enters Saturn as an initial search term, the dispersion occurs at the top level, and since the categories differ at the top-level different search results are retrieved. For instance, the results may be under the categories Automotive\Saturn, Science\Planets\Saturn or Recreation\Astrology\Horoscope etc. In other words, depending on the query term, the user can see search results for either the top-level categories or the sub categories. As a result, the user is allowed to narrow down the search results or filter out categories such that search results within categories of interest to shown to the user in a disperse format.

Following a category ID may be a list of document IDs of electronic documents having the category ID where the unique index term appears. The document ID may be the form of a URL or a domain hash representative of the URL. Further, following a document ID may be a list of attributes of the index term of an electronic document represented by the document ID. Such attributes may be used to determine a relevance ranking of the electronic document in a search result. For example, the relevance ranking may correspond to a relevance-rating attribute of a particular document relative to a particular category as determined by the ranking tool 220. Furthermore, following an attribute of document ID may be content chunk data that corresponds to contextual description or snippets for each particular document ID being maintained by index 116. That is, the content chunk data includes summary description information for each web page as identified by the document ID for display to the user via the display.

As shown in Table 1, an exemplary portion of index 116 includes the index term "Apples" (see R1C1). Following this index term is a list of category IDs where document data corresponding to the index term "Apples" exists. In this instance, category ID values 2 and 4 (see R1-R3C2 and R4-R6C2, respectively) correspond to the term "Apples." Following each of the category IDs is a list of document IDs of electronic documents having the particular category ID where document data corresponding to the particular index term exists. As a result, document IDs can be grouped according to each category ID that corresponds to a particular term listed in the index. For instance, document data corresponding to the index term "State-Washington" exists in electronic documents having document IDs of 307, 308, and 315. Also shown in Table 1, the exemplary portion of index 116 includes the index term "Saturn" followed by a list of category IDs, which are each followed by a list of document IDs of electronic documents where document data corresponding to this index term appears.

Figure 3:
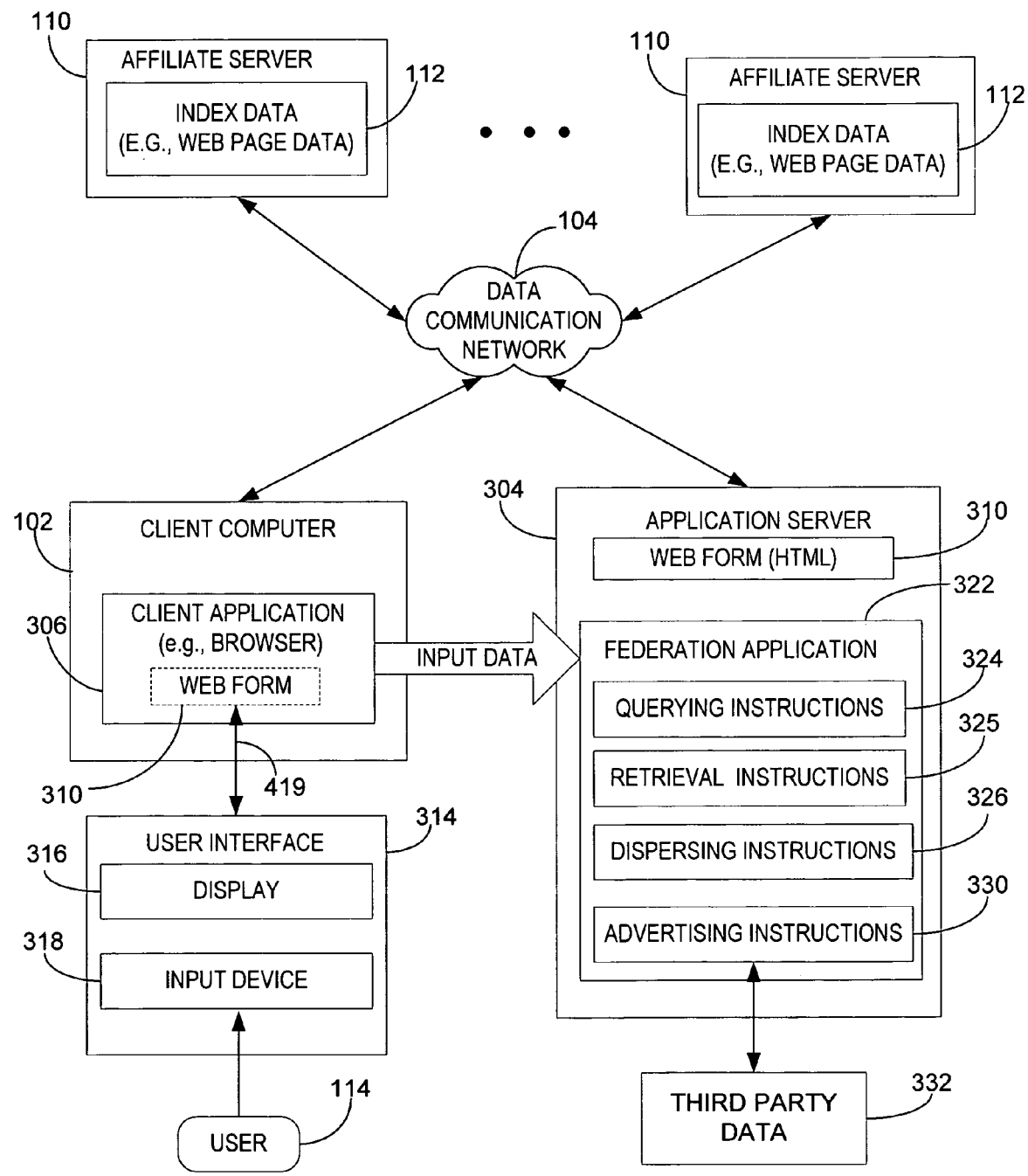
FIG. 3 is a block diagram illustrating components of system for dispersing search results according to category for display on a first page of search results according to one embodiment of the invention.

Referring next to FIG. 3, an exemplary block diagram illustrates components of the client 102, an application server 304 (e.g., back-end server 108), and one or more affiliate servers 110 according to one embodiment of the invention.

A client application 306 allows a user 114 to retrieve HTML documents from the server 304 via communication network 104. The client application 306 is executable by client 102 and responsive to user input data for initiating the retrieval of such HTML documents (i.e., web form) 310. One skilled in the art will appreciate that client application 306 may be a web browser such as the Internet Explorer® browser offered by Microsoft Corporation. Frequently, the user 114 uses the client application 306 to contact the server 304 to retrieve a web form 310 that accepts input data from the user 114.

A user-interface (UI) 314 linked to client 102 allows user 114 to interact with the retrieved web form 310. For example, the UI 314 may include a display 316 such as a computer monitor for viewing web form 310 and an input device 318 such as a keyboard or a pointing device (e.g., a mouse, trackball, pen, or touch pad) for entering data into web form 310, as indicated by 319. In other words, UI 314 allows user 114 to define search data on the home client, and allows user 114 to submit a request to the server 304 to search index data 112 (or subindex data 222) maintained on each of the affiliate server 110 for the defined data.

Figure 4:
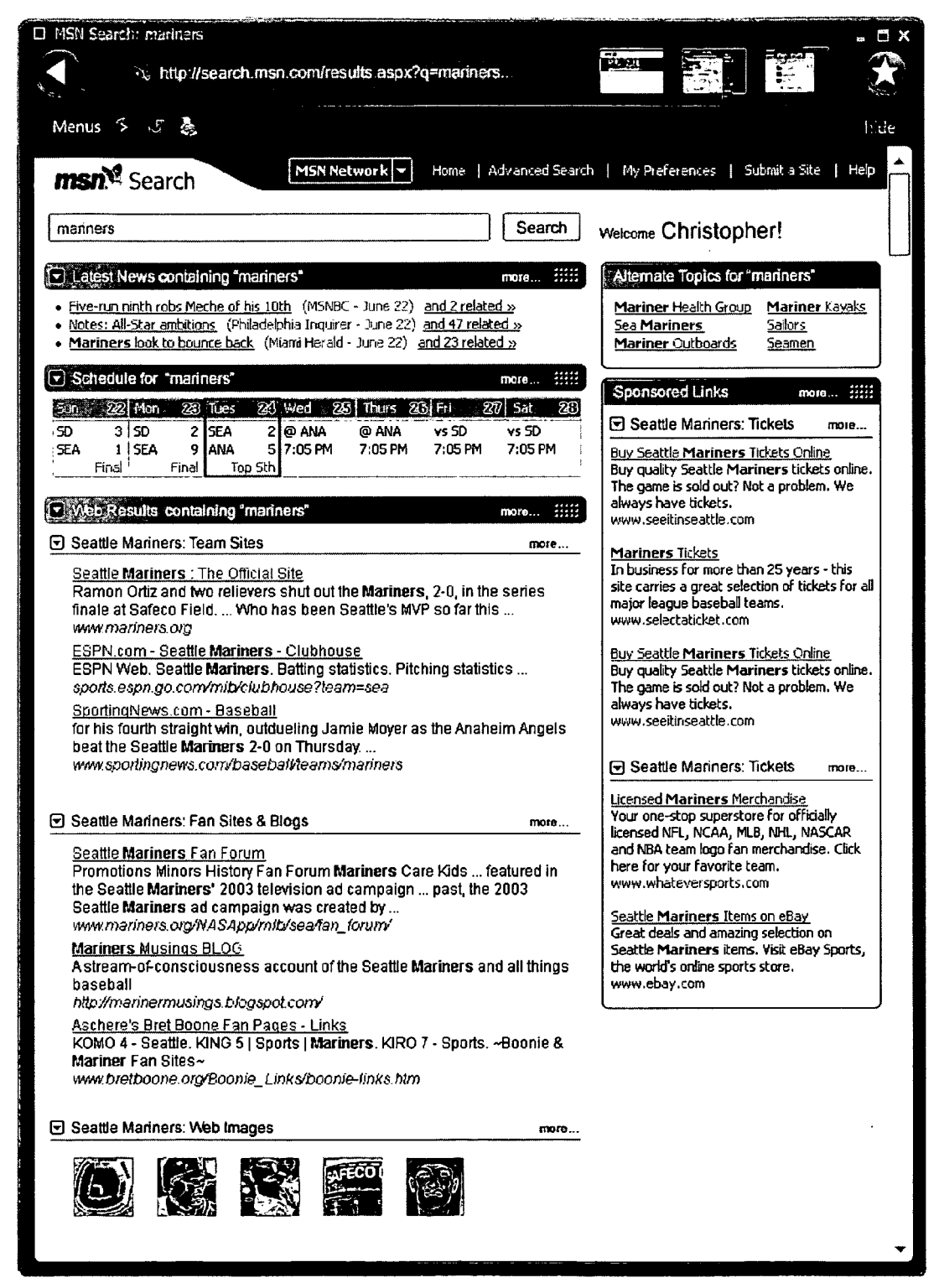

In this exemplary embodiment, application server 304 both authenticates the user request and provides a web resource and/or service to an authenticated user (e.g., serves as front-end server 106 and back-end server 108.) A search engine application 322 is responsive to the user search request and executable by the application server 304 to query the index data 112 maintained on each of the affiliate servers 110 for document data matching the defined search data. For example, a user using the client computer 102 inputs the term "apples" into a web form, and submits a search request for the term "apple" to the server 304. The search engine application 322 includes querying instructions 324 for querying index terms listed in the index data 112 to identify an index term that matches search data defined by the user. If a matching index term is found, the search engine application 322 executes retrieval instructions 325 to retrieve corresponding category ID data, document ID data, attribute data, and content chunk data from the index. The search engine 322 includes dispersing instructions 326 for displaying a search results form such as shown in FIG. 4 to the user on the display 316. The displayed search results include summary description information (i.e., content chunk data) for each electronic document as identified by a particular document ID that corresponds to a matched index term.

In one embodiment, dispersing instructions 326 generate a search result form in which content chunk data is displayed for a predetermined number of document IDs for each category ID listed in the index adjacent to the matching index term. As an example, for the search term "apple," the dispersing instructions 326 may generate a form 328 displaying a maximum of five links for each of the following categories associated with the term "apple" business or manufacturer (e.g., Apple® Computers), cooking recipes, science/health; and farming. Referring again to Table 1, the generated search result form may include content chunk data such as the Summary_Desc data listed in the index shown in Table 1. Moreover, the displayed links and/or content data for each electronic document identified as having a matching term, are grouped in a list according to a particular category, and are organized according to the relevance rating associated with each document ID listed adjacent to the category ID corresponding to the particular category. For example, for the search term "apple," the electronic document having the Summary_Desc "APPLES & MORE PRESERVING APPLES" would appear at the top of the grouped list related to the fruit category (i.e., category ID=2), the electronic document having the Summary_Desc "APPLES & NUTRITION COOKING WITH APPLES" would appear next in this particular grouping, and the electronic document having the Summary_Desc "EASY FRUIT SALAD" would appear at the bottom in this particular grouping. Thus, even if a search term defined by the user 114 is associated with a broad range of categories, the user is provided best results from different categories on the first page of search results so that the user can easily identify desired results.

In another embodiment, the number of search results displayed to the user 114 on the search results form is a function of the number of category IDs (i.e., categories) listed in the index data 112 adjacent to the matching index term. For example, if there are a total of three category IDs listed adjacent to the matching index term, content chunk data corresponding to document IDs with top one-third (33.33%) relevance rating values will be displayed to the user 114 via the search results form. In other words, even if a search term defined by the user is associated with a broad range of topics (i.e., categories), the user 114 is provided results from different categories on a single page of search results so that the user can easily identify desired results.

In yet another embodiment, the search engine application 322 includes advertising retrieval instructions 330. Advertising retrieval instructions 330 are responsive to the retrieved category ID data and executable by the application server 304 to query a third party data source 332 for advertising information related to one or more of the identified categories for display to the user on the search results form. For example, if category ID data specifies an automotive category, the advertising instructions 330 query the third party data source and display advertising banners related to automobile manufacturers. As a further example, referring again to Table 1, if the matching index term is "Saturn" (see R1:C10), one of the corresponding category ID data fields has a value of "7" (see R2:C10) which, in this instance, is indicative of an automotive category. The advertising instructions 330 may display advertising information for Saturn® automobile dealers.

Figure 5:
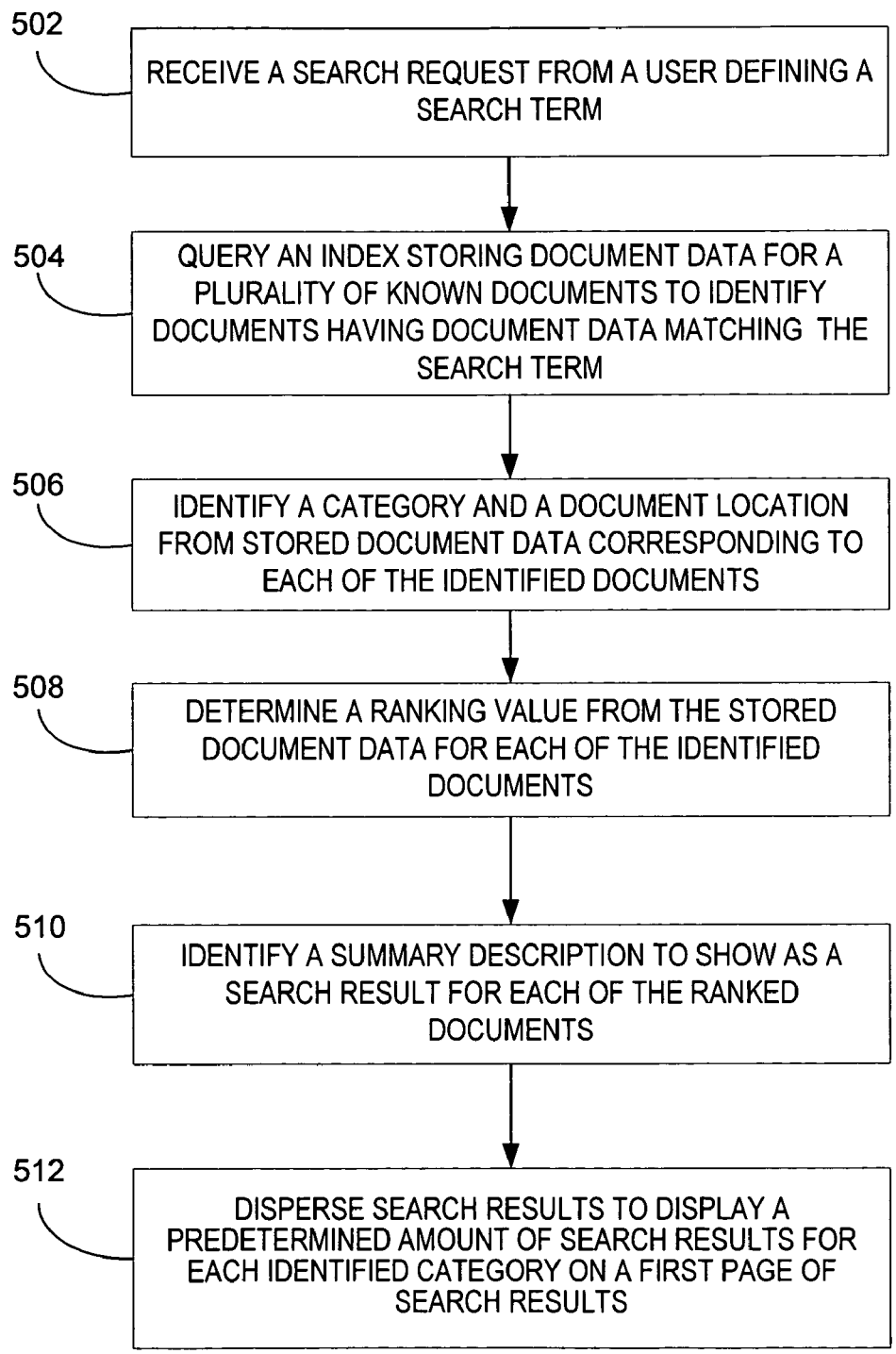
FIG. 5 is an exemplary flow chart illustrating a method for dispersing search results by category for display to a user on a first page of search results according to one embodiment of the invention.

Referring next to FIG. 5, an exemplary flow chart illustrates a method for dispersing search results by category for display to user 114 on a single page of search results. At 502, an application such as search engine application 118 receives a search request from the user 114. The search request is defined by the user and specifies one or more terms (e.g., single words, multiple words) that may appear in, or that may be expected to appear in one or more desired web pages available via the Internet. The search engine application 118 queries index 116 storing document data including index terms for a plurality of known web pages to identify one or more known web pages having index terms that match the specified index term at 504. At 506, search engine application 118 identifies a category and document location from the stored document data for each of the identified one or more web pages. Search engine application 118 determines a rating or ranking value from the stored document data for each of identified one or more documents at 508. The ranking, or rating value, indicates the relevance of a particular identified document to a particular identified category. At 510, the process identifies a summary description from the stored document data to show as a search result for each of the identified documents. The search engine application 118 disperses search results such that, for example, a predetermined amount of search results for each identified category are displayed to the user on a first page of search results at 512. In other words, a group of search results is displayed for each identified category (i.e., category ID) on the first page of search results.

Search results may also include identified document locations (e.g., document ID) grouped according to a common identified category to be presented to user along with the summary description. In one preferred embodiment, the grouped search results are organized such that each of document IDs and/or summary descriptions being displayed in a particular category grouping are organized in a sequence according to their corresponding ranking values.

Figure 6:
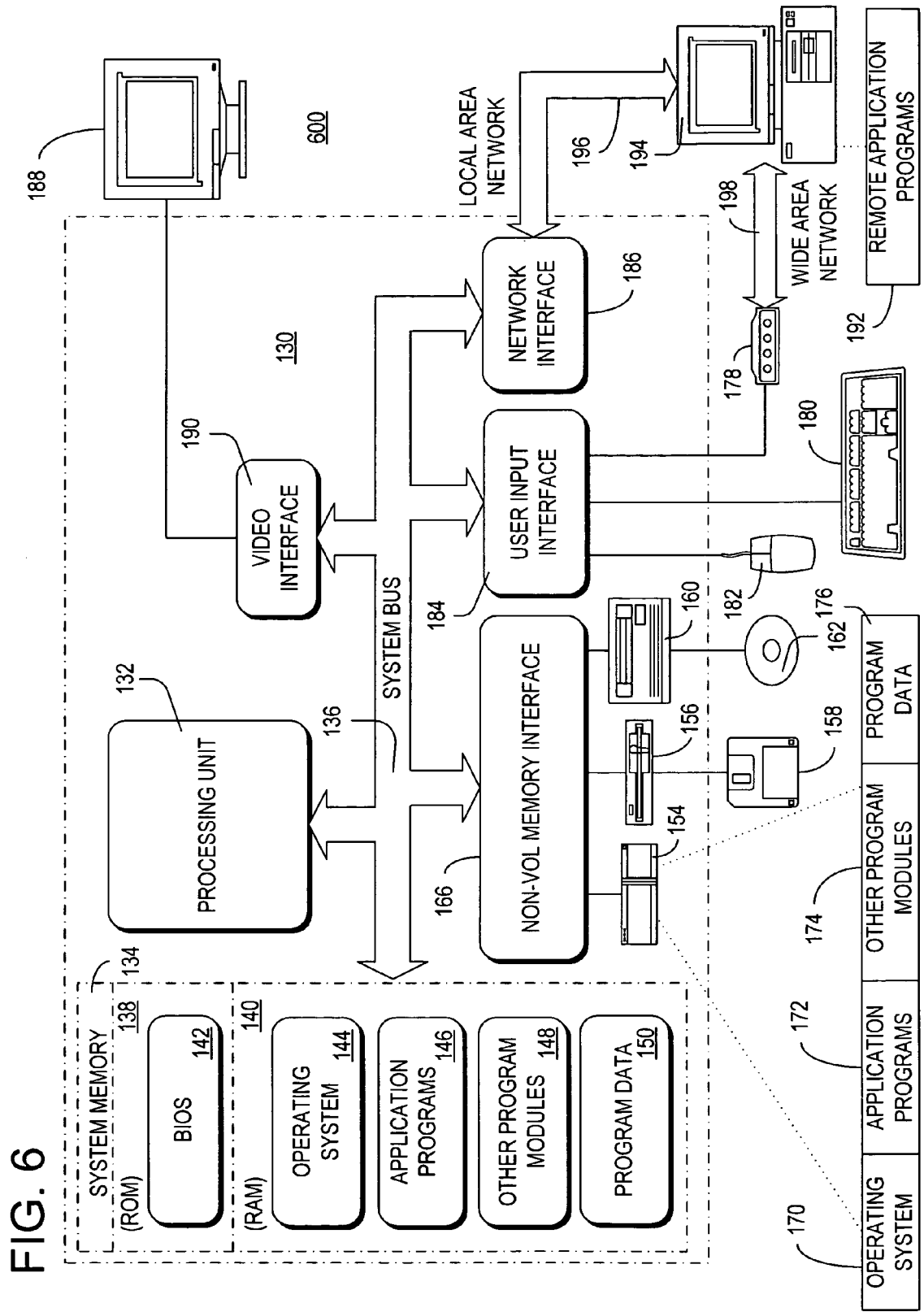
FIG. 6 is a block diagram illustrating an exemplary embodiment of a suitable computing system environment in which one embodiment of the invention may be implemented.

Referring now to FIG. 6, one example of a general purpose computing device in the form of a computer 130 is shown. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer-readable media. Computer-readable media, which include both volatile and nonvolatile media, removable and non-removable media, may be any available medium that can be accessed by computer 130. By way of example and not limitation, computer-readable media comprise computer storage media and communication media. Computer storage media include volatile and nonvolatile, removable and non-removable media implemented in any method or technology for storage of information such as computer-readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer-readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer-readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer-readable instructions, data structures, program modules and other data for the computer 130. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more roaming clients, such as a roaming client 194. The roaming client 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and roaming client storage media including memory storage devices.

In operation, computer 130 executes computer-executable instructions such as those illustrated in FIG. 5, to generate search results.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the constructions and methods without departing from the scope of the invention, it is intended that all matter contained in the above description and shown in the accompanying drawings shall be interpreted as illustrative and not in a limiting sense.

What is claimed is:

1. A method of generating search results comprising:
   receiving a search request from a user, said search request including one or more terms;
   querying a searchable central data index as a function of the received search request to identify electronic documents for relevance with respect to the one or more terms in the search request, said index containing document data associated with a plurality of electronic documents, said document data specifying one or more categories associated with each of the electronic documents and including a ranking value associated with each of the electronic documents relative to the categories, said ranking value being stored in the index and indicating a relevance of a particular electronic document to a particular category, said index organizing said document data by dispersing said document data belonging to various categories associated with each of the electronic documents in said index;
   assigning a confidence level to each of the one or more specified categories;
   in response to the querying, generating search results identifying electronic documents based on relevance to the one or more terms in the search request to be displayed on a single result page, wherein the generated search results include relevant electronic documents within the various categories from the index that correspond to the one or more terms in the search request based on the ranking value associated with each of the electronic documents and the confidence level of the one or more corresponding categories;
   dispersing the generated search results according to the specified one or more categories associated with each of the electronic documents identified in the search results;
   sorting the dispersed search results of said querying according to the one or more categories as a function of the ranking value associated with each of the identified electronic documents; and
   displaying the sorted results to the user such that one or more of the identified electronic documents in different categories are displayed to the user on the single result page.

2. The method of claim 1, wherein displaying includes displaying a predetermined number of identified electronic documents in each of the different categories as a function of the ranking values.

3. The method of claim 2, wherein displaying includes displaying the sorted results as a function of both a total number of different categories and the ranking value for each of the identified electronic documents in each of the different categories.

4. The method of claim 2, wherein the displaying includes displaying the sorted results in groups, each group corresponding to a particular category, and each group listing a description of the identified electronic documents in the particular category in a descending order based on the ranking value associated with each of the identified electronic documents in the particular category.

5. The method of claim 1 wherein each of the electronic documents comprises one or more of the following: a web page and a multimedia file.

6. The method of claim 1, wherein querying the searchable index farther includes querying a third party data source to retrieve advertising data related to the different categories, and wherein displaying the sorted results further includes displaying the retrieved advertising data relative to the different categories of the identified electronic documents.

7. A computer storage medium comprising computer-executable instructions for generating search results, comprising:
   a search form component for receiving a search request from a user;
   a search engine component for querying a searchable central data index as a function of the received search request to identify electronic documents for relevance with respect to the search request and for sorting the results of said querying, said index containing document data associated with a plurality of electronic documents, said document data specifying one or more categories associated with each of the electronic documents, said index organizing said document data by dispersing said document data belonging to various categories associated with each of the electronic documents in said index, wherein the search engine component assigns a confidence level to each of the one or more specified categories; said results being dispersed and sorted as a function of the one or more categories associated with the identified electronic documents, said specified one or more categories associated with the dispersed and sorted results being determined by the electronic documents identified in the search results, wherein the generated search results include relevant electronic documents within the various categories from the index that correspond to the one or more terms in the search request based on the ranking value associated with each of the electronic documents and the confidence level of the one or more corresponding categories; and
   a user interface component for displaying the sorted results to the user such that one or more of the identified electronic documents in different categories are displayed to the user on a single page, wherein the user interface component displays to the user the search results according to one of the following: the categories of the generated search results, top-level categories of the categories of the generated search results, the subcategories of the categories of the generated search results, selectively narrow down the search results, or filter out categories such that search results within categories of interest to shown to the user.

8. The computer storage medium of claim 7, wherein the document data includes a ranking value associated with each of the electronic documents relative to the one or more categories, said ranking value being stored in the index and indicating a relevance of a particular electronic document to a particular category, and wherein the user interface component is configured to display a predetermined number of identified electronic documents in each of the different categories as a function of the ranking values.

9. The computer storage medium of claim 8, wherein the user interface component is further configured to display the sorted results as a function of both a total number of different categories and the ranking value for each of the identified electronic documents in each of the different categories.

10. The computer storage medium of claim 8, wherein the user interface component is further configured to display the sorted results in groups, each group corresponding to a particular category, and each group listing a description of the identified electronic documents in the particular category in a descending order based on the ranking value associated with each of the identified electronic documents in the particular category.

11. The computer storage medium of claim 7, wherein the search engine component is further configured to query a third party data source to retrieve advertising data related to the different categories, and wherein the user interface component is further configured to display the retrieved advertising data relative to the different categories of the identified electronic documents.

12. A system for generating search results in response to a search request received from a user, said user generating the search request via a client, said system comprising:
   a first server for receiving the search request from the user via the client, said first server being coupled to the client via a communication network;
   an index containing document data associated with a plurality of electronic documents, said document data specifying one or more categories associated with each of the electronic documents, said index organizing said document data by dispersing said document data belonging to various categories associated with each of the electronic documents in said index;
   wherein said first server assigns a confidence level to each of the one or more specified categories, and
   wherein said first server is configured to query the index as a function of the received search request to identify electronic documents for relevance with respect to the search request and to sort the results of said query, said results being dispersed according to the specified one or more categories, wherein the specified one or more categories being determined by the electronic documents identified in the results, said results being sorted as a function of the one or more categories associated with the identified electronic documents for displaying to the user at the client such that one or more of the identified electronic documents in different categories are displayed to the user on a single page, wherein the generated search results include relevant electronic documents within the various categories from the index that correspond to the one or more terms in the search request based on the ranking value associated with each of the electronic documents and the confidence level of the one or more corresponding categories.

13. The system of claim 12, wherein the document data includes a ranking value associated with each of the electronic documents relative to the one or more categories, said ranking value being stored in the index and indicating a relevance of a particular electronic document to a particular category, and wherein a predetermined number of identified electronic documents in each of the different categories are displayed as a function of the ranking values.

14. The system of claim 13, wherein the sorted results are displayed as a function of both a total number of different categories and the ranking value for each of the identified electronic documents in each of the different categories.

15. The system of claim 13, wherein the sorted results are displayed in groups, each group corresponding to a particular category, and each group listing a description of the identified electronic documents in the particular category in a descending order based on the ranking value associated with each of the identified electronic documents in the particular category.

16. The system of claim 12, wherein the first server is configured to provide a web form to the client for receiving the search request from the user.

17. The system of claim 12, wherein the first server is further configured to query a third party data source to retrieve advertising data related to the different categories, and wherein the retrieved advertising data is displayed relative to the different categories of the identified electronic documents.

18. The system of claim 12, wherein the document data included in the index is partitioned and transferred to a plurality of sub-indexes for storage, each of said plurality of sub-indexes being maintained on a plurality of affiliate servers, and wherein the first server is responsive to the received search request to query at least one of the said plurality of sub-indexes to identify one or more electronic documents within different categories.

19. The method of claim 1, further comprising using one or more computer storage media having stored thereon a searchable data structure in conjunction with said receiving, said querying, said assigning, said generating, said dispersing, said sorting and said displaying, said data structure comprising:
   a first field for storing data representing a central search engine index term associated with an electronic document located on a network, said index term being included in the electronic document;
   a second field for storing data representing a document category corresponding to the electronic document, said stored data in the second field including a document confidence level relating to the document category;
   a third field for storing data representing a location corresponding to the electronic document on the network; and
   wherein the document data included in the second field is indexed according to the first field such that one or more document categories are associated with the index term, said data structure dispersing electronic documents belonging to various document categories, and wherein the document data included in the third field is indexed according to the second field such that one or more locations of the electronic documents are associated with each of the one or more document categories, and
   wherein, in response to a query in a search request, the stored data in the third field representing the electronic document is displayed on a single result page based on a combined relevance to the query in the search request, the stored data representing the central search engine index term, and the document confidence level of the document category associated with the index.

20. The method of claim 19, wherein the data structure further includes a fourth field representing a document ranking value associated with the electronic document, said document ranking value indicating a relevance of a particular electronic document to a particular document category, and wherein document data included in the fourth field is indexed according to the third field such that one or more ratings are associated with each electronic document the associated with the particular document category.

21. The method of claim 19, wherein an application is configured to receive a search request to search the index to determine if the index term stored in the first field matches query data specified in the received search request, wherein, if the index term stored in the first field matches the query data, the application is further configured to identify the corresponding document category specified in the second field and to identify the corresponding document location stored in the third field, and wherein the application provides search results including identified document locations to the user, and wherein said search results are grouped by category according to the corresponding document category specified in the second field associated with the electronic document identified in the search results.

22. The method of claim 21, wherein the data structure further includes a fifth field representing a summary description associated with the known electronic document, and wherein the grouped search results provided to the user by the application include the summary description associated with the electronic document.

23. The method of claim 19, wherein the document data further includes one or more of the following: data in hypertext transfer protocol (HTTP) header, meta tag, extensible markup language (XML) data, and resource description framework (RDF) data.

* * * * *

UNITED STATES PATENT AND TRADEMARK OFFICE
CERTIFICATE OF CORRECTION

PATENT NO. : 7,428,530 B2  Page 1 of 1
APPLICATION NO. : 10/883460
DATED : September 23, 2008
INVENTOR(S) : Bama Ramarathnam et al.

It is certified that error appears in the above-identified patent and that said Letters Patent is hereby corrected as shown below:

In column 5, line 5, after "various" insert -- web servers 210 accessible via the Internet (or the World Wide Web) 104. As known to those skilled in the art, seed data 206 may include a list of URLs, each identifying a location of a particular web server 210 maintaining one or more HTML documents. The fetching module 208 uses seed data 206 (i.e., seed URLs) to initiate a crawl of network 104 (e.g., the World Wide Web). As used herein, the term "crawl" refers to the process of retrieving and analyzing content on web pages identified by the seed data 206. For example, during the crawling process, URLs included in each of the retrieved web pages are identified by the fetching module 208 and used to access and analyze content on additional web pages. --.

In column 16, line 10, in Claim 6, delete "farther" and insert -- further --, therefor.

Signed and Sealed this
Nineteenth Day of April, 2011

David J. Kappos
*Director of the United States Patent and Trademark Office*